INVENTOR.
WILSON M. BRUBAKER
BY
Christie, Parker & Hale
ATTORNEYS

Dec. 6, 1960 W. M. BRUBAKER 2,963,555

SPEED CONTROLS FOR REPRODUCTION OF TAPE RECORDINGS

Filed Feb. 21, 1955 2 Sheets-Sheet 2

INVENTOR.
WILSON M. BRUBAKER

BY

Christie, Parker & Hale

ATTORNEYS

United States Patent Office 2,963,555

Patented Dec. 6, 1960

2,963,555

SPEED CONTROLS FOR REPRODUCTION OF TAPE RECORDINGS

Wilson M. Brubaker, Arcadia, Calif., assignor, by mesne assignments, to Consolidated Electrodynamics Corporation, Pasadena, Calif., a corporation of California Filed Feb. 21, 1955, Ser. No. 489,639

9 Claims. (Cl. 179—100.2)

Figure 1:
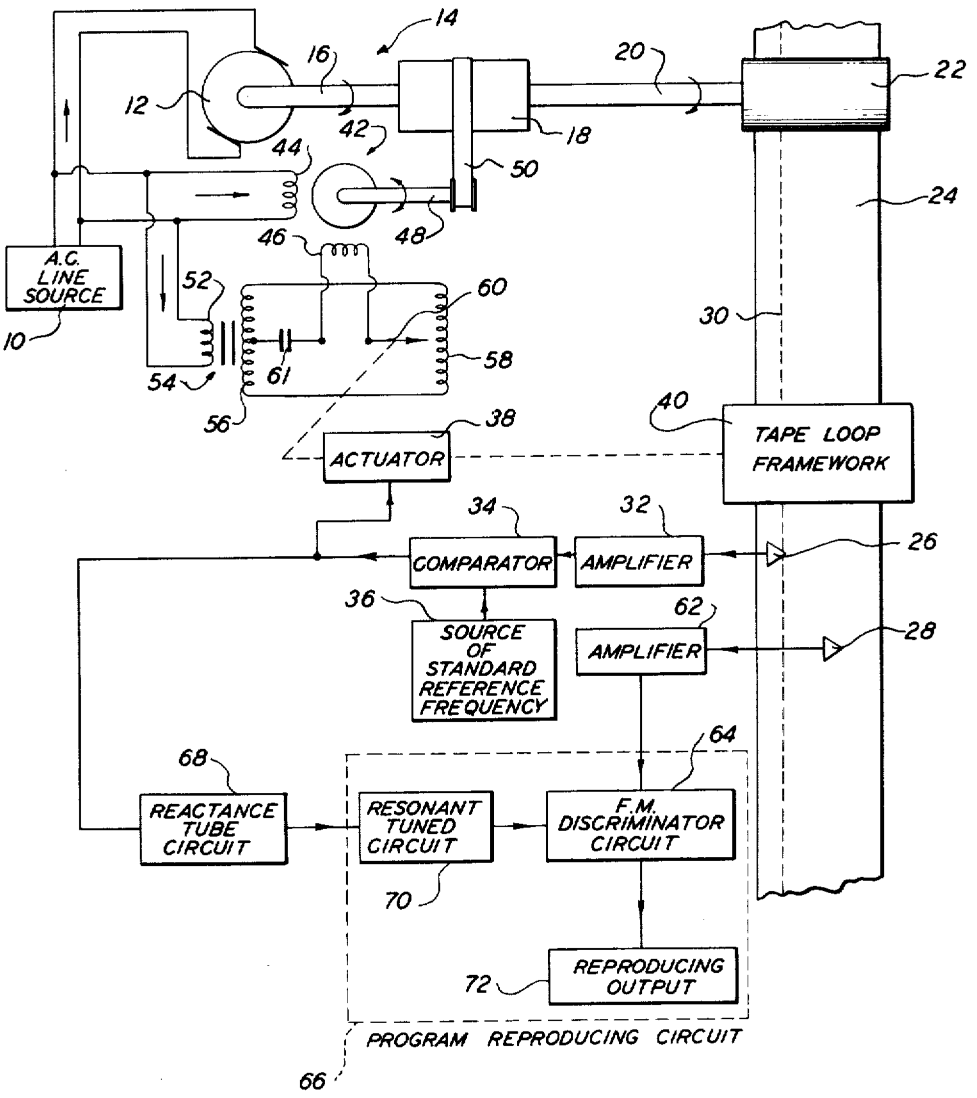

This invention relates to the field of magnetic tape recordings, and it has particular reference to servo means for controlling the speed of a magnetic tape recording when it is being played back.

A magnetic tape playback system usually includes a tape drive mechanism which drives the tape past one or more sensing heads at a substantially constant speed. The tape drive mechanism normally comprises a drive motor having a shaft which connects to a cylindrical capstan drive member whose rotation drives the tape, and the sensing heads pick up signals recorded on the tape and apply these signals to a reproducing circuit which reproduces the signals in desired form.

In recent times the magnetic tape method for recording information has been adapted to a variety of special uses, as for example the recording of data in scientific experiments. As the field has expanded and become more specialized, the systems for reproducing a program recorded on a magnetic tape have been improved in accordance with an increasing requirement that the reproduced program be more nearly an exact replica of the true program.

As a step in this direction, the program is usually put on the tape as a frequency-modulated signal. On playback it is highly important for the tape to move past the sensing heads at a controlled speed, since the speed of the tape is a determinative factor in the frequency of the signal sensed by the head. Owing to variations in the velocity of the tape during the recording of the program, stretching of the tape and additional variations in the velocity of the tape during playback, the reproduced program may tend to differ from the true program. The requirement is that these imperfections be eliminated, or that some means be provided to compensate for them.

Much progress has been made in the manufacture of magnetic tapes and in the design of tape drive mechanisms so that these imperfections are greatly reduced. In addition, advances have been made in the art of compensating for remaining imperfections, both by controlling the speed of the tape on playback and by varying the frequency-response of the program reproducing circuit to the program signal on the tape.

Compensation is normally made possible through the recording of a reference frequency signal on the tape at the same time the program is recorded, and assuming that the reference frequency signal will be modified in the same manner as is the program by the tape speed and stretch imperfections. When this recorded reference frequency is picked up by a sensing head and compared with a standard source of reference frequency, the difference in the frequencies can be used to produce a mechanical or electrical signal, sometimes referred to as an error signal, which is representative of the tape speed and stretch imperfections.

Servo-control systems responsive to the error signal described above have taken various forms. Among these are those which use the error signal to control the drive motor of a tape drive mechanism; those using the error signal to control an auxiliary motor which is coupled with the tape drive mechanism; and those using the error signal to adjust the frequency-response of the program reproducing circuit.

All of these control systems are limited in their response to the error signal. Thus, servo-motors which respond to the error signal for controlling the speed of the tape are limited by their inertia to following the lower and zero frequency alternations of the error signal, and generally serve to make tape speed corrections which maintain the overall average error near zero. On the other hand, the frequency response of the program reproducing circuit may be varied at a high frequency by the error signal, but the total range of frequency-response variation is generally quite limited and, even when a servo-motor control system is used in conjunction, intermediate durations and amplitudes of the error signal may remain which cannot be followed.

I have devised a low inertia, tape-speed control which is responsive to the intermediate frequencies of the error signal. I provide a mechanical frame which supports a loop of the moving tape so that movement of the tape-loop does not affect the lineal speed of the tape provided by the capstan drive member. The mechanical frame is connected to a movable member of an actuator which is responsive to the error signal for generating a position of the movable member up to moderate frequencies. The sensing heads contact the tape-loop and movement of the mechanical frame moves the tape-loop and adds or subtracts from the speed of the tape past the sensing heads in accordance with the error signal.

The device is limited as to the distance it can move the tape-loop, so some means may be necessary to control the average speed of the tape in accordance with the error signal. To accomplish this, I prefer to use an auxiliary motor having a shaft connected to the tape drive mechanism. The arrangements shown in my copending application Serial No. 482,021, filed January 17, 1955, are satisfactory for this purpose. These arrangements serve to cause any rotation of the auxiliary motor shaft to add or subtract from the speed of rotation of the capstan drive member and thus control the drive speed of the tape.

The auxiliary motor is preferably tied in with the position of the movable member of the actuator so that the electric energy supplied to the motor is controlled in accordance with displacement of the movable member. This controls the rotation of the shaft of the auxiliary motor.

The combination of the auxiliary motor control with the tape-loop control keeps the tape-loop operating within its limits of movement so that it tends to make only the smaller and intermediate frequency tape-speed compensations.

If desired, a third control may be added to the playback system by applying the error signal to vary the frequency-response of the program reproducing circuit, and the higher frequencies of the error signal that are missed by the tape-loop control are followed. This does not involve tape-speed control and has practically zero inertia. The tape-loop control is sufficiently responsive to the error signal to keep the frequency-response variation within its limits of operation.

Figure 2:
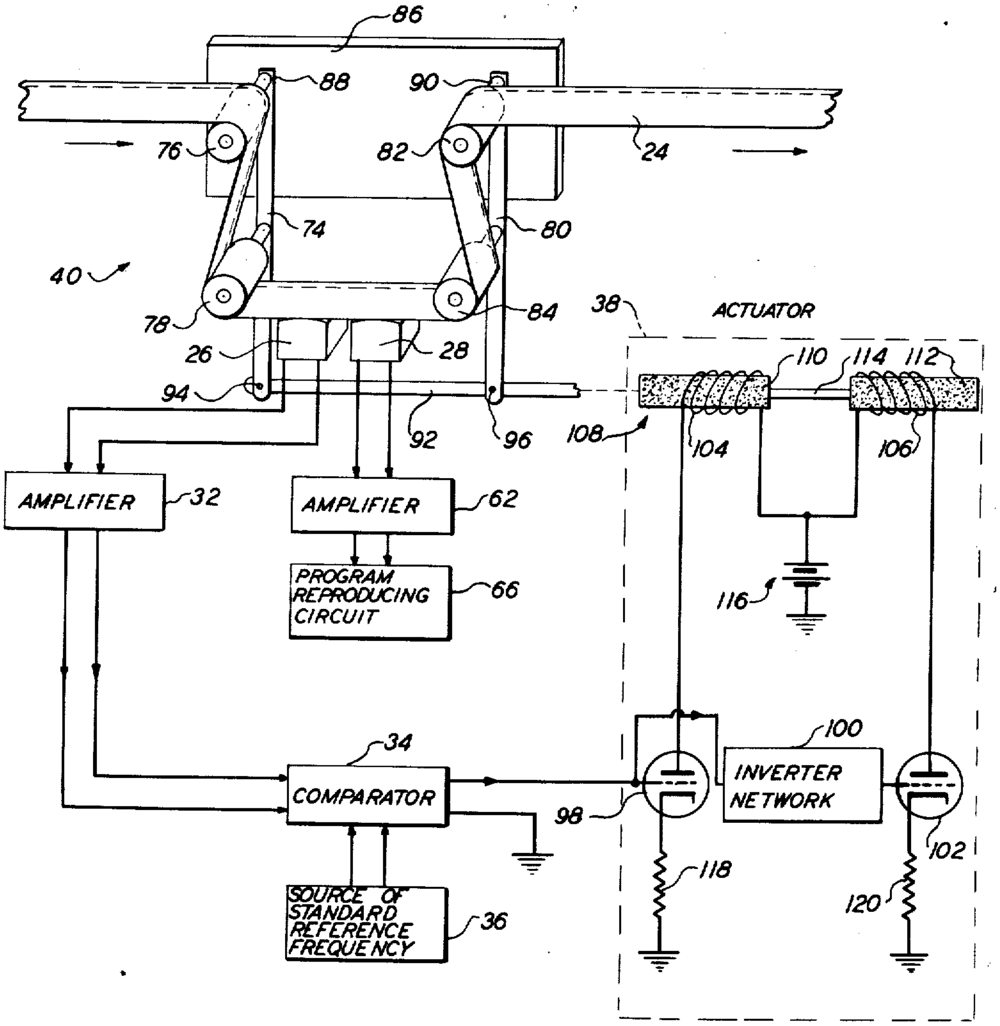

In accordance with a preferred embodiment, the invention is described in detail with reference to the drawings, in which:

Fig. 1 is a schematic diagram showing a magnetic tape playback system provided with a complete set of speed controls; and Fig. 2 is a larger scale schematic diagram showing how the tape-loop-actuator arrangement is connected into the system of Fig. 1.

With reference to Fig. 1, an alternating current line source 10 furnishes power to a drive motor 12 of a tape drive mechanism 14. The drive motor has a shaft 16 connected through a differential arrangement 18 to a continuing shaft 20 which turns a capstan drive member 22.

The capstan drive member drives a magnetic tape 24 past a reference frequency sensing head 26 and a reproducing sensing head 28 at a substantially constant speed.

A reference frequency signal 30 is recorded on the tape and is sensed by the reference frequency sensing head which applies the signal through an amplifier 32 to a comparator 34. A source of standard reference frequency 36 is also applied to the comparator. The comparator produces a voltage which varies in accordance with difference between the said reference frequencies, referred to as the error signal or the comparator voltage.

An actuator 38 receives the comparator voltage and generates a position which controls a tape loop framework 40 for making alternating variations in the speed of the tape past the sensing heads, without affecting the speed of the tape relative to the axis of the capstan drive member.

An auxiliary motor 42 having a first phase winding 44, a second phase winding 46 and a shaft 48 is mechanically coupled to the differential arrangement by a continuous belt 50. This auxiliary-motor-and-differential-arrangement is preferably that described in my copending application Serial No. 482,021, filed January 17, 1955, and serves to add to or subtract directly from the speed of the tape by causing any rotary movement of the auxiliary motor shaft to add to or subtract from the rotation of the capstan drive member.

The auxiliary motor is shown powered by the A.C. line source, which is connected to its first phase winding. The source is also connected to the primary winding 52 of a transformer 54. The transformer has a secondary winding 56 which is connected in series with a similar coil 58. The similar coil is contacted by a variable contact 60 which connects to one end of the second phase winding of the auxiliary motor, and the secondary winding of the transformer is centrally tapped by a lead from the other end of the second phase winding of the auxiliary motor. A condenser 61 is connected on the lead between the secondary winding of the transformer and the second phase winding of the auxiliary motor. The condenser maintains a 90° phase difference between the alternating current applied through the first and second phase windings of the auxiliary motor.

In operation, the actuator controls the position of the variable contact 60 so as to control the polarity and magnitude of the signal applied through the second phase winding 46 of the auxiliary motor. When the error signal is zero, the variable contact 60 is located centrally on the coil 58 so that there is no voltage across the second phase winding of the auxiliary motor.

The reproducing head 28 senses the recorded program and applies it through an amplifier 62 to a discriminator circuit 64 of a program reproducing circuit 66. The comparator voltage is applied to a reactance tube circuit 68 which controls the capacitance of a resonant tuned circuit 70 so that it varies the frequency-response of the discriminator in accordance with high frequency variations in the comparator voltage. The program is demodulated by the discriminator in accordance with its frequency-response, and the demodulated program is then applied to the reproducing output 72 which reproduces the program in desired form. It should be apparent that the inductance of the resonant tuned circuit could be controlled to vary the frequency-response of the discriminator, and it is not necessary that it be the capacitance of the resonant tuned circuit which is controlled.

Fig. 2 shows schematically the tape-loop-and-actuator arrangement of Fig. 1. The magnetic tape 24 is held in a loop by a mechanical framework 40 having a first rigid arm 74 on which is mounted a free roller 76 and a similar free roller 78, and a second rigid arm 80 on which is mounted a free roller 82 and a similar free roller 84.

The first rigid arm is connected to a stable member 86 by a pivot connection 88 disposed in line with the axis of rotation of the free roller 76, and the second rigid arm is connected to the stable member 86 by a pivot connection 90 disposed in line with the axis of rotation of the free roller 82. The pivot connections to the stable member are disposed a distance apart and in line with the direction of tape travel, and they allow the rigid arms to swing along the direction of tape travel.

A rigid linkage 92 is connected between the rigid arms by a pivot connection 94 to the first rigid arm and a pivot connection 96 to the second rigid arm. The pivot connections 94, 96 are disposed a distance apart along the rigid linkage so that they fix the rigid arms parallel to each other.

The reference frequency sensing head 26 and the reproducing sensing head 28 are disposed to contact the tape on the portion of the loop between the arms, the former supplying the recorded reference frequency through the amplifier 32 to the comparator 34 and the latter supplying the program through the program amplifier 62 to the program reproducing circuit 66. As in Fig. 1, a source of standard frequency 36 is also applied to the comparator; and the comparator produces a voltage which varies with the difference between the recorded and standard reference frequencies.

The comparator voltage is fed to the actuator 38. It is applied between ground and the grid of a first electron tube 98, and through an inverter network 100 to the grid of a second electron tube 102. The anode of the first tube is connected to one end of a first coil 104, and the anode of the second tube is connected to one end of a second coil 106. The coils face each other on a common axis and enclose a movable member 108 having a first magnetic portion 110 disposed within the first coil, a second magnetic portion 112 disposed within the second coil, and a non-magnetic portion 114 connecting the two magnetic portions 110, 112.

The other end of each coil is connected to the positive terminal of a battery 116, and the negative terminal of the battery is connected to ground. The cathodes of the first and second tubes are connected through similar resistors 118 and 120 to ground.

In operation, the comparator voltage biases the two identical tubes in an opposite manner due to the inverter network, causing the conductance of one tube to exceed the conductance of the other, and thereby causing more magnetic flux in one coil than in the other. The movable member 108 has a tendency to center itself lengthwise of the coils, and the coils are arranged so that this tendency as introduced by each coil will be in opposite directions. Thus, when the magnetic flux in one coil exceeds the magnetic flux in the other coil, the movable member will be displaced. If this is carried on at a moderate frequency, the movable member will move accordingly.

The movable member actuates the rigid linkage 92 which pivots the parallel arms 74, 80. This action moves the tape-loop past the sensing heads 26, 28 without affecting the lineal speed of the tape produced by the capstan drive member shown in Fig. 1. Thus, the comparator voltage causes the tape-loop to move in a direction which tends to cancel out the comparator voltage.

I claim:

1. In a magnetic tape playback system including a stationary sensing head, means for producing an error signal indicative of a variation in tape speed from a desired speed, apparatus responsive to the error signal for controlling the speed of the tape past the sensing head in accordance with the error signal, said apparatus comprising a mechanical frame which supports a portion of the tape for movement therewith and in a loop around the sensing head, the mechanical frame being reciprocally and linearly movable parallel to the travel of the tape and actuator means responsive to the error signal and connected to the frame for moving it in a direction and amount in accordance with said error signal and causing the tape-loop to move so as to add to or subtract from the speed of the tape relative to the sensing head whereby the tape is moved past the sensing head at the desired speed.

2. In a magnetic tape playback system including a stationary sensing head, means for producing an error signal indicative of a variation in tape speed from a desired speed, apparatus responsive to an error signal for controlling the speed of the tape past the sensing head in accordance with the error signal, said apparatus comprising a mechanical framework having a plurality of free rollers which support a portion of the tape in a loop so that the sensing head operates on the tape in the loop, and an actuator having a movable member connected to the framework and responsive to the error signal for adjusting the position of said movable member and causing the tape-loop to move so as to add to or subtract from the speed of the tape relative to the sensing head in accordance with said error signal.

3. In a magnetic tape playback system including a stationary sensing head, an apparatus for controlling the speed of the tape past the sensing head comprising a reference frequency signal recorded on the tape, a source of standard reference frequency signal, comparator means to which both the recorded reference signal and the standard reference signal are applied for producing a voltage in accordance with the difference between said signals, a mechanical framework having a plurality of free rollers which support a portion of the tape in a loop so that the sening head is within the loop, and an actuator having a movable member connected with the framework and responsive to the comparator voltage for adjusting the position of said movable member and causing the tape-loop to move so as to add to or subtract from the speed of the tape relative to the sensnig head in accordance with said comparator voltage.

4. In a magnetic tape playback system including a stationary reproducing head past which the tape is driven by a tape drive mechanism having a drive motor, an apparatus for controlling the speed of the tape relative to the head comprising a reference signal recorded on the tape, a source of standard reference signal, comparator means to which the recorded signal and the standard signal are applied for producing a voltage in accordance with any difference between said signals, actuator means responsive to the comparator voltage, a reciprocally and linearly movable mechanical frame carrying a loop of the tape and coupled to the actuator whereby movements of the frame act to add to or subtract from the speed of the tape relative to the reproducing head, an auxiliary electric motor responsive to the actuator, and means coupling the auxiliary motor to the tape drive mechanism whereby the combination of the auxiliary motor and said frame are effective to provide a difference signal of substantially zero voltage.

5. In a magnetic tape playback system including a stationary reproducing head, past which the magnetic tape is driven by a capstan drive member rotated by a drive motor of a tape drive mechanism, an apparatus for controlling the speed of the tape relative to the reproducing head comprising a reference frequency signal recorded on the tape, a source of standard reference signal, comparator means to which both the recorded reference signal and the standard reference signal are applied for producing a voltage in accordance with the difference between the said signals, low inertia actuator means responsive to the comparator voltage, and reciprocally and linearly movable mechanical means connecting the actuator to a movable loop of the magnetic tape which contacts the reproducing head so that the actuator response controls the speed of the tape relative to the reproducing head independently of the speed of the tape relative to the axis of rotation of the capstan drive member, an auxiliary electric motor responsive to the actuator, and mechanical means connecting the auxiliary motor to the tape drive mechanism so that it controls the speed of rotation of the capstan drive member.

6. In a system for reproducing a program recorded on a magnetic tape, the system including a tape drive mechanism having a drive motor for moving the tape past a stationary reproducing head, an apparatus for controlling the speed of tape movement past the reproducing head comprising means for producing a voltage representative of the desired speed control to be effected at any time, actuator means responsive to the control voltage and connected by a reciprocally and linearly movable mechanical framework to a loop of tape which contacts the reproducing head for producing alternating displacements of the tape-loop past the reproducing head which add to or subtract from the speed of the tape relative to the reproducing head, an auxiliary motor having a rotatable shaft, means responsive to the algebraic sum of the displacements produced by the actuator for controlling the rotation of the shaft of the auxiliary motor, and mechanical means connecting the shaft of the auxiliary motor to the tape drive mechanism for correcting the driven speed of the tape so that the actuator means tends to produce only those displacements which are within its limits of movement.

7. In a system for reproducing a program recorded on a magnetic tape, the system including a tape drive mechanism for driving the tape past a stationary reproducing head and means for producing an electrical voltage representative of tape-speed dependent errors in the reproduced program, an apparatus for controlling the speed of tape movement past the reproducing head in accordance with the error voltage comprising an actuator having a movable member and connected to the error voltage for adjusting the position of the movable member which varies in accordance with the error voltage, a mechanical frame which supports a loop of the moving tape so that the reproducing head contacts the tape-loop, the said mechanical frame being connected to the said movable member so that the position of the frame is reciprocally and linearly varied in accordance with the error voltage and causes displacements of the tape-loop past the reproducing head which add to or subtract from the speed of the tape relative to the reproducing head, and auxiliary motor means connected to the tape drive mechanism and responsive to displacement of the movable member for controlling the drive speed of the drive mechanism so that the movable member and mechanical frame operate within their limits of movement.

8. In a system for reproducing a frequency modulated program recorded on a magnetic tape, the system including a stationary sensing head past which the tape is driven by a tape drive mechanism having a drive motor, an apparatus for causing the reproduced program to be more nearly an exact replica of the true program comprising a reference frequency signal recorded on the tape, means for sensing the recorded reference frequency, a source of standard reference frequency, comparator means to which both recorded reference frequency and the standard frequency are applied for producing a voltage which varies with frequency difference between the said reference ferquencies, a low frequency control means including an auxiliary motor mechanically coupled to the tape drive mechanism for controlling the drive speed of the tape, a medium frequency control means including a low inertia actuator having a movable member which is responsive to the comparator voltage for adjusting the position of the movable member, a mechanical frame which supports a loop of the moving tape so that the sensing head contacts the tape-loop, said mechanical frame being connected to said movable member so that the position of the frame is varied at medium frequency by the actuator's response to the comparator voltage and causes medium frequency displacements of the tape loop past the sensing head which add to or subtract from the speed of the tape relative to the sensing head, means intercoupling the actuator with the auxiliary motor for controlling the auxiliary motor with the displacement of the movable member of the actuator, a reproducing circuit including a discriminator circuit having a resonant tuned circuit for receiving the program from the sensing head and reproducing it in desired form, and a high frequency control means including a reactance tube circuit responsive to the comparator voltage and connected to the tuned circuit of the discriminator circuit for effecting a high frequency control of the frequency-response of the discriminator circuit in accordance with the comparator voltage.

9. In a system for reproducing a frequency modulated program recorded on a magnetic tape, the system including a stationary sensing head past which the tape is driven by a tape drive mechanism having a drive motor, an apparatus for causing the reproduced program to be more nearly an exact replica of the true program comprising a reference frequency signal recorded on the tape, means for sensing the recorded reference frequency, a source of standard reference frequency, comparator means to which both recorded reference frequency and the standard reference frequency are applied for producing a voltage which varies with frequency difference between the said reference frequencies, a low frequency control means including an auxiliary motor mechanically coupled to the tape drive mechanism for controlling the drive speed of the tape, a medium frequency control means including a low inertia actuator coupled by a reciprocally and linearly movable mechanical framework to a loop of the magnetic tape which contacts the sensing head, the actuator being responsive to the comparator voltage to move the mechanical framework thereby moving the tape-loop relative to the sensing head, means intercoupling the medium frequency control means with the low frequency control means for controlling the auxiliary motor in accordance with the movement produced by the actuator, a reproducing circuit for receiving the program from the sensing head and reproducing it in desired form, and a high frequency control means responsive to the comparator voltage for varying the frequency-response of the reproducing circuit.

References Cited in the file of this patent

UNITED STATES PATENTS

| | | |
|---|---|---|
| 2,024,609 | Smythe | Dec. 17, 1935 |
| 2,203,706 | Stockbarger | June 11, 1940 |
| 2,378,234 | Meyer | June 12, 1945 |
| 2,656,407 | Herrick | Oct. 20, 1953 |
| 2,656,419 | Dingley | Oct. 20, 1953 |
| 2,697,754 | Ranger | Dec. 21, 1954 |
| 2,714,202 | Downing | July 26, 1955 |
| 2,817,073 | Sorrells | Dec. 17, 1957 |